United States Patent Office 2,749,325
Patented June 5, 1956

2,749,325

ACRYLONITRILE POLYMER BLENDS AND
PROCESS OF PRODUCING THEM

Alfred B. Craig, Dayton, Ohio, assignor, by mesne assignments, to The Chemstrand Corporation, a corporation of Delaware No Drawing. Application July 28, 1951,
Serial No. 239,199

12 Claims. (Cl. 260—45.5)

This invention relates to a novel method of preparing blended polymers useful in the fabrication of synthetic fibers. More particularly the invention relates to a procedure whereby the usual difficulty in mixing and drying stable aqueous emulsions of vinylpyridine polymers are minimized or avoided. The invention also provides a novel composition which is more useful than blends made by the prior art method from the same proportions of identical monomers.

In the preparation of fiber-forming acrylonitrile polymers, it is well-known that substantial proportions of acrylonitrile must be present in polymeric form. For example, at least 80 per cent of the total polymerized monomers must be acrylonitrile. The balance of the polymerizable monomer may be any mono-olefinic composition which is selected for the modifying effects that it has upon the copolymer or blended polymer. Monomers such as styrene, alpha-methylstyrene, the acrylate esters, the methacrylate esters, methacrylonitrile and vinyl acetate usually render the copolymers more soluble and more readily workable. Other copolymers are frequently introduced to make the copolymer or blended polymers more susceptible to conventional dyeing procedures. The introduction of comonomers, and especially comonomers in separate polymer form frequently improve the thermostability of the fibers prepared from these blends.

It is known to the art that copolymers of 85 or more per cent of acrylonitrile and up to 15 per cent of other polymerizable monomers are capable of fabrication into high tenacity fibers with good chemical and physical properties. These copolymers, and especially when copolymerized with alkyl acrylates, such as ethyl acrylate, the alkyl methacrylates, such as methyl methacrylate, the vinyl carboxylates, such as vinyl acetate, vinyl or isopropenyl aromatic hydrocarbons, such as styrene, alpha-methylstyrene, and vinylbiphenyl and methacrylonitrile are not sufficiently dye-receptive to enable their use in the preparation of general purpose fibers. It is known that these non-dyeable polymers may be rendered dye-receptive if they are blended with a sufficient quantity of a vinylpyridine copolymer so as to provide from two to ten per cent of polymeric vinylpyridine in the blended polymer. The vinylpyridine polymer under such circumstances may be a copolymer of from tewenty to 80 per cent of the vinylpyridine and from 80 to twenty per cent of a polymerizable comonomer. In this practice the vinylpyridine may be 2 - vinylpyridine, 4 - vinylpyridine, 2 - methyl - 5 - vinylpyridine, 5 - ethyl - 2 - vinylpyridine, 3-methyl-5-vinylpyridine, 3-ethyl-5-vinylpyridine, or other alkyl substituted vinylpyridines wherein the alkyl radical has from one to four carbon atoms. The comonomer for the vinylpyridine copolymer may be styrene, alpha-methylstyrene, the alkyl acrylates, the alkyl methacrylates, methacrylonitrile, and particularly acrylonitrile.

The usual preparation of the blended acrylonitrile vinylpyridine polymers presents very serious difficulties. The vinylpyridine copolymers are difficult to prepare in uniform homogeneous aqueous emulsions. To prevent the formation of irregular aggregates and the adherence to sidewalls and stirring apparatus, it is necessary that emulsifying or dispersing agents be used in substantial quantity. The elimination of water from the stable aqueous emulsion of the vinylpyridine necessitates a costly drying procedure, or a separate coagulation step which usually introduces objectionable impurities in the separated polymer. Accordingly, the separate preparation of the acrylonitrile polymer and the vinylpyridine copolymer and the subsequent mixing of the separated polymers is not usually practicable. Furthermore, when the polymers are separately prepared and mixed either as aqueous dispersion or as solid polymer the blend does not appear to be homogeneous and solutions prepared therefrom are cloudy or opaque.

The primary purpose of this invention is to provide a novel polymeric composition which is completely soluble to form clear solutions. A further purpose is to provide a novel procedure for preparing a fiber-spinning resin of superior properties. A still further purpose is to provide a pseudoblend polymer wherein one prepared component is chemically modified by a further but different polymerization.

In accordance with this invention it has been found that very desirable polymers can be prepared free of the objectionable properties and without the difficulties inherent in resin blending procedures, if the acrylonitrile is polymerized in the presence of a separately prepared vinylpyridine copolymer. The normally stable vinylpyridine copolymer, which is usually very difficult to separate from the aqueous medium in which it is suspended, gradually changes in form during the polymerization of the acrylonitrile and in the preferred procedure the polymer is precipitated and separates from the aqueous medium in which it is dispersed. The resulting product is not a true blend, but it is believed to be a modified copolymer in which the vinylpyridine copolymer molecules are further polymerized with acrylonitrile. The acrylonitrile is believed to add on to the polymer chain terminals and in some cases to form side chains. The further polymerization changes the surface characteristics of the polymer particles and increases their weight, so as to form larger and different particles which readily settle out of the aqueous medium. The new process may be conducted by several different methods, all of which require the separate formation of a vinylpyridine copolymer emulsion by any manner known to the art. The copolymer emulsion may be charged to a polymerization reactor and acrylonitrile added thereto to effect the subsequent polymerization. The same result may also be achieved by charging the acrylonitrile to a reactor and gradually adding the vinylpyridine copolymer emulsion. A similar result may also be obtained by charging a predetermined portion of acrylonitrile and the vinylpyridine emulsion and continuing polymerization in a batchwise manner. These various polymerization methods must necessarily involve the polymerization of the nitrile for a substantial period of time after all of the vinylpyridine emulsion is present in the reaction medium, so as to insure the modification by polymerization of all of the vinylpyridine nuclei. Thus, if the copolymer emulsion is added to an acrylonitrile polymerization, the emulsion should be completely charged before 75 per cent of the acrylonitrile has been polymerized.

The stable vinylpyridine polymer emulsion, which is the suspension medium for polymerizations in accordance with this invention is separately prepared by polymerizing from twenty to 80 per cent of a vinylpyridine with from 80 to twenty per cent of a suitable comonomer. Vinylpyridines included within the contemplation of the applicant are 2-vinylpyridine, 3-vinylpyridine, 4-vinylpyridine, 2-vinyl-5-methylpyridine, 3-vinyl-5-methylpyridine, 2-vinyl-4-methylpyridine, 5-ethyl-2-vinylpyridine, 3-vinyl-5-methylpyridine, and other alkyl vinylpyridines wherein the alkyl group has from one to four carbon atoms. Suitable comonomers for the preparation of the vinylpyridine copolymers are the alkyl acrylates, such as methyl methacrylate and ethyl acrylate, the vinyl and isopropenyl aromatic hydrocarbons, such as styrene and isopropenylbiphenyl, the vinyl carboxylates, such as vinyl acetate, vinylidene chloride, methacrylonitrile, and acrylonitrile. Of these comonomers, the acrylonitrile is the most important since the proportion present in the vinylpyridine copolymer will enhance the thermostability and chemical stability of the fiber prepared from the blends.

The vinylpyridine copolymer emulsions are prepared by the polymerization of the monomers in the desired proportions in an aqueous medium using an emulsion stabilizer suitable for retaining the formed copolymer in a fine suspension in the aqueous medium. It has been found that such stabilizing agents are those which are stable under basic conditions, for example those exhibiting a pH of from eight to ten in aqueous solution. A wide variety of these emulsion stabilizing agents are available but especially good results have been obtained by using a mixture of a fatty acid soap or other salts of weak acids with hydrophobic characteristics. The dispersing agent may be used to the extent of from 0.5 to five percent based on the weight of the monomers charged.

The polymerizations are conducted in the presence of water-soluble peroxy compounds, for example the alkali metal and ammonium persulfates, the alkali metal and ammonium percarbonates, and alkali metal and ammonium salts of other acids containing the peroxy —(—O—)— grouping. The catalysts are used to the extent of from 0.1 to two per cent by weight of the monomer charged. The optimum catalyst concentration lies between 0.2 and 2.0 per cent. The catalysts may be charged at the beginning of the reaction or continuously or in periodic increments throughout the course of the reaction so as to provide an approximately uniform concentration in the reaction medium throughout the course of the reaction.

The stable vinylpyridine emulsions may be prepared by batch procedure wherein all of the monomer is charged at the beginning of the reaction and all of the stable emulsion discharged from the reaction vessel when the reaction is completed. Alternatively, the stable copolymers may be prepared by continuous procedure wherein the monomers are gradually added as polymerization proceeds and the stable emulsions withdrawn continuously from the reaction medium. A preferred method of conducting the reaction involves the semi-continuous technique in which a predetermined quantity of monomer is added gradually to the reaction mixture and the stable emulsion withdrawn from the reaction vessel when all of the predetermined quantity of monomer has been charged and polymerized. The latter procedure is preferred because the reaction is more readily controlled and the emulsion so prepared is free of aggregates and otherwise chemically and physically uniform.

The stable emulsions described in the preceding paragraph are used entirely or in part as the suspension medium for the polymerization of fiber-forming acrylonitrile polymers. The acrylonitrile polymerized in this medium may be the only monomer in the polymerization reaction. The acrylonitrile, however, may be polymerized conjointly with other monomers, for example, styrene, vinyl chloride, vinyl acetate, and vinylidene chloride. The preferred practice involves the use of at least 85 per cent acrylonitrile and up to 15 per cent of the comonomer. This polymerization requires only the water-soluble peroxy catalyst, for example the alkali metal and ammonium persulfates, or the alkali metal and ammonium salts of other peroxy acids, such as percarbonic acid and perboric acid. The preferred practice involves the use of from 0.2 to 2.0 per cent of the peroxy catalysts.

The practice of this invention may involve the use of emulsifying or dispersing agents although these are not essential. Suitable dispersing agents are the substances which have both hydrophobic and hydrophilic substituents and which prevent the agglomeration of the polymer particles and insuring a finely divided but readily separable polymer. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amino soaps," such as triethanol amine, and dodecyl methyl amine, salts of rosin acids and mixtures thereof, the water-soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to five per cent by weight of the monomers may be employed.

If desired, "Redox" agents may be present in the reaction mixture. These are generally compounds in a lower valent state which are readily oxidized to the higher valent state under the conditions of reaction. Through the use of this oxidation-reduction system it is possible to obtain a polymerization to the substantial extent at lower temperatures than otherwise would be required. The use of lower temperatures thereby enables the preparation of more color-free polymers since the higher temperatures favors the formation of the colored bodies. Suitable "Redox" agents are sulfur dioxide, the alkali metal and ammonium bisulfites and sodium formaldehyde sulfoxylate.

If desired, the new polymerizations may be effected in the presence of regulators, which substances are chain terminators whereby the polymer molecular weights are more nearly uniform. This additional factor of uniformity is desirable for the preparation of optimum synthetic fibers. Suitable regulators for the practice of this invention are tertiary-dodecylmercaptan, mercaptoacetic acid and other organic compounds containing mercapto substituents.

Further details of the invention are set forth with respect to the following specific examples:

*Example 1*

A mixture of 50 grams of acrylonitrile and 50 grams of 2-vinylpyridine was fed continuously over a two-hour period into a flask containing 125 cc. of water and two grams of sodium stearate. During the addition period, the reaction media was stirred and held at reflux. Simultaneously, a stream containing one gram of catalyst dissolved in 25 cc. of water was added. Unpolymerized monomer was removed by distillation and a stable emulsion of the polymer resulted.

*Example 2*

A two-liter flask fitted with stirrer, thermometer, reflux condenser and addition funnels was charged with 187 grams of the emulsion of the preceding example and 700 grams of water. The emulsion was stirred at reflux for two hours during which time a mixture of 285 grams of acrylonitrile, 15 grams of vinyl acetate, and 0.6 gram of thioglycolic acid was added continuously. At the same time four grams of potassium persulfate dissolved in 150 cc. of water was added. The slurry was held at reflux for an additional half hour and then steam distilled to remove the last traces of unpolymerized monomer. The polymer blend was isolated by filtration and drying and was found to contain six per cent vinylpyridine.

A solution of this copolymer in dimethylacetamide was prepared and compared to a solution of the same over-all composition prepared by dry blending a copolymer of 95 per cent of acrylonitrile and five per cent vinyl acetate and a copolymer containing 50 per cent acrylonitrile and 50 per cent vinylpyridine and then dissolving in dimethylacetamide. It was found that the polymer blend made by the technique of this invention gave a much clearer solution in dimethylacetamide.

*Example 3*

A copolymer emulsion of 40 per cent of vinylpyridine and 60 per cent of acrylonitrile was prepared as in Example 1. A one-liter, stirred flask was charged with 111 grams of this emulsion and 215 grams of water. A mixture of 145.5 grams of acrylonitrile, 4.5 grams of vinyl acetate and 0.45 gram thioglycolic acid was added over a two-hour period while adding a separate stream of two grams of potassium persulfate dissolved in 100 cc. of water. The emulsion was entirely coagulated during the addition of monomer and the polymer blend was isolated by filtration and drying. This polymer blend gave a clear solution in dimethylacetamide at 80° C. where a normal blend of the two polymers having the same overall composition gave a very turbid solution under the same conditions.

*Example 4*

A copolymer emulsion was prepared by the method described in Example 1 except that the copolymer had a composition of 35 per cent of vinylpyridine and 65 per cent of acrylonitrile. A one-liter flask was charged with 129 grams of this emulsion, 200 grams of water, and 0.15 gram of the sodium salt of a formaldehyde condensed sulfonated naphthalene. While this mixture was stirred at reflux, a mixture of 145.5 grams of acrylonitrile, 4.5 grams of vinyl acetate and 0.45 gram of tertiary-dodecylmercaptan was added over a two-hour period while a separate stream of 2.5 grams of potassium persulfate dissolved in 75 cc. of water was also added. The polymer blend was isolated by filtration and drying after removal of unreacted monomers by steam distillation.

This polymer blend gave clear solutions in dimethylacetamide at room temperature. However, a dry blend prepared by mixing a copolymer of 35 per cent of vinylpyridine and 65 per cent of acrylonitrile and one of 97 per cent of acrylonitrile and three per cent of vinyl acetate gave only very turbid solutions in dimethylacetamide even when heated above 100° C.

Spinning tests made on these two solutions showed that the clear solution of the polymer blend made by the technique of this invention spun very readily, whereas the turbid solution made by the normal technique was very difficult to spin into fibers.

*Example 5*

A copolymer emulsion was prepared as in Example 1, wherein the copolymer contained 50 per cent of 2-methyl-5-vinyl-pyridine and 50 per cent of acrylonitrile.

A two-liter flask fitted with a stirrer, thermometer, reflux condenser, and the necessary addition funnels was charged with 600 cc. of water. While the contents of the flask were refluxed over a two-hour period, a mixture of 291 grams of acrylonitrile, nine grams of vinyl acetate, and 0.9 gram of tertiarydodecylmercaptan was added. During the same period, 160 cc. of a two per cent potassium persulfate solution was added. Starting when 60 per cent of the monomer mixture had been added and finishing before 75 per cent of the monomers had been added, a third feed comprising 75 cc. of the copolymer emulsion described in the first paragraph of this example diluted with 350 cc. of water was gradually charged to the reaction vessel. At the end of the reaction, excess monomers were removed by steam distillation and the polymer blend was isolated by filtration and drying. This polymer blend gave a clear, homogeneous solution in dimethylacetamide.

What I claim is:

1. A method of preparing a fiber-forming acrylonitrile polymer blend which comprises contacting a monomeric composition comprising at least 85 percent of acrylonitrile and up to 15 percent of another mono-olefinic monomer coplymerizable therewith with an aqueous emulsion of a copolymer of from 20 to 80 percent by weight of a compound having the formula:

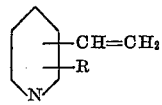

wherein R is selected from the group consisting of hydrogen and an alkyl radical containing from one to 4 carbon atoms, and from 80 to 20 percent by weight of a polymerizable mono-olefinic monomer selected from the group consisting of alkyl acrylates, alkyl methacrylates, vinyl carboxylates, vinyl and isopropenyl aromatic hydrocarbons, vinylidene chloride, methacrylonitrile and acrylonitrile, in the presence of a water-soluble peroxy compound, interrupting the emulsion addition before 75 percent of the acrylonitrile has been polymerized, and separating the reacted copolymer which has been further polymerized with the acrylonitrile copolymer, said blend being so prepared as to provide from 2 to 10 percent of the compound in polymeric form in the blended polymer.

2. A method of preparing a fiber-forming acrylonitrile polymer blend which comprises contacting acrylonitrile with an aqueous emulsion of a copolymer of from 20 to 80 percent by weight of a compound having the formula:

$$\begin{array}{c}\diagup\diagdown\\ \Big|\phantom{xx}\Big|\!\!-\!\!CH\!=\!CH_2\\ \Big|\phantom{xx}\Big|\!\!-\!\!R\\ \diagdown_N\diagup\end{array}$$

wherein R is selected from the group consisting of hydrogen and an alkyl radical containing from one to 4 carbon atoms, and from 80 to 20 percent by weight of a polymerizable mono-olefinic monomer selected from the group consisting of alkyl acrylates, alkyl methacrylates, vinyl carboxylates, vinyl and isopropenyl aromatic hydrocarbons, vinylidene chloride, methacrylonitrile and acrylonitrile, in the presence of a water-soluble peroxy compound, interrupting the emulsion addition before 75 percent of the acrylonitrile has been polymerized, and separating the reacted copolymer which has been further polymerized with acrylonitrile, said blend being so prepared as to provide from 2 to 10 percent of the compound in polymeric form in the blended polymer.

3. The method defined by claim 2 wherein the compound is 2-vinylpyridine.

4. The method defined by claim 2 wherein the compound is 4-vinylpyridine.

5. The method defined by claim 2 wherein the compound is 2-methyl-5-vinylpyridine.

6. The method defined by claim 2 wherein the compound is 5-ethyl-2-vinylpyridine.

7. The method defined by claim 2 wherein there is employed a copolymer of 2-vinylpyridine and acrylonitrile.

8. The method defined by claim 2 wherein there is employed a copolymer of 4-vinylpyridine and acrylonitrile.

9. The method defined by claim 2 wherein their is employed a copolymer of 2-methyl-5-vinylpyridine and acrylonitrile.

10. The method defined by claim 2 wherein there is employed a copolymer of 5-ethyl-2-vinylpyridine and acrylonitrile.

11. A method of preparing an acrylonitrile polymer blend which comprises gradually adding acrylonitrile to an aqueous emulsion of a copolymer of from 20 to 80 percent by weight of a compound having the formula:

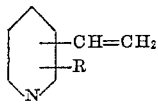

wherein R is selected from the group consisting of hydrogen and an alkyl radical containing from one to 4 carbon atoms, and from 80 to 20 percent by weight of a polymerizable mono-olefinic monomer selected from the group consisting of alkyl acrylates, alkyl methacrylates, vinyl carboxylates, vinyl and isopropenyl aromatic hydrocarbons, vinylidene chloride, methacrylonitrile and acrylonitrile, in the presence of a water-soluble peroxy compound, continuing the polymerization until the emulsified polymer is entirely precipitated, and separating the reacted copolymer which has been further polymerized with acrylonitrile, said blend being so prepared as to provide from 2 to 10 percent of the compound in polymeric form in the blended polymer.

12. A method of preparing an acrylonitrile polymer blend which comprises contacting acrylonitrile with a water-soluble peroxy compound in an aqueous medium, introducing into the polymerization reaction mixture an emulsion of a copolymer of from 20 to 80 percent by weight of a compound having the formula:

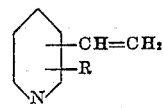

wherein R is selected from the group consisting of hydrogen and an alkyl radical containing from one to 4 carbon atoms, and from 80 to 20 percent by weight of a polymerizable mono-olefinic monomer selected from the group consisting of alkyl acrylates, alkyl methacrylates, vinyl carboxylates, vinyl and isopropenyl aromatic hydrocarbons, vinylidene chloride, methacrylonitrile and acrylonitrile, interrupting the emulsion introduction before 75 percent of the acrylonitrile has been polymerized, and separating the reacted copolymer which has been further polymerized with acrylonitrile, said blend being so prepared as to provide from 2 to 10 percent of the compound in polymeric form in the blended polymer.

References Cited in the file of this patent
UNITED STATES PATENTS

| | | |
|---|---|---|
| 2,527,863 | Webb | Oct. 31, 1950 |
| 2,538,779 | Harrison et al. | Jan. 23, 1951 |
| 2,569,470 | Hagemeyer et al. | Oct. 2, 1951 |
| 2,620,324 | Coover et al. | Dec. 2, 1952 |
| 2,637,717 | Basdekis | May 5, 1953 |
| 2,640,049 | Rothrock | May, 26, 1953 |